(12) United States Patent
Mohseni et al.

(10) Patent No.: US 10,523,810 B2
(45) Date of Patent: Dec. 31, 2019

(54) SYSTEMS, METHODS, AND APPARATUSES FOR IMPLEMENTING DSL LINE FAULT DETERMINATION AND LOCALIZATION VIA SELT, DELT, AND MELT DIAGNOSTICS

(71) Applicants: Mehdi Mohseni, Menlo Park, CA (US); Ming-Yang Chen, Stanford, CA (US); Adaptive Spectrum and Signal Alignment, Inc., Redwood City, CA (US)

(72) Inventors: Mehdi Mohseni, Menlo Park, CA (US); Ming-Yang Chen, Stanford, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 15/543,793

(22) PCT Filed: Jan. 14, 2015

(86) PCT No.: PCT/US2015/011470
§ 371 (c)(1),
(2) Date: Jul. 14, 2017

(87) PCT Pub. No.: WO2016/114776
PCT Pub. Date: Jul. 21, 2016

(65) Prior Publication Data
US 2018/0027113 A1 Jan. 25, 2018

(51) Int. Cl.
*H04M 3/30* (2006.01)
*H04M 3/487* (2006.01)
(Continued)

(52) U.S. Cl.
CPC ............ *H04M 3/306* (2013.01); *H04B 3/487* (2015.01); *H04L 41/0631* (2013.01);
(Continued)

(58) Field of Classification Search
CPC ...... H04M 11/062; H04M 3/304; H04M 3/26; H04M 3/306; H04M 1/24; H04M 3/085;
(Continued)

(56) References Cited

U.S. PATENT DOCUMENTS

| | | | | |
|---|---|---|---|---|
| 4,896,114 A | * | 1/1990 | Donner | G01R 31/10 324/522 |
| 5,319,311 A | * | 6/1994 | Kawashima | G01R 31/11 324/533 |
| 7,254,217 B2 | * | 8/2007 | Rude | H04B 3/23 370/242 |
| 9,071,678 B2 | * | 6/2015 | Yang | H04B 3/46 |

(Continued)

FOREIGN PATENT DOCUMENTS

| | | |
|---|---|---|
| EP | 2464089 A1 | 6/2012 |
| EP | 2575342 A1 | 4/2013 |

(Continued)

OTHER PUBLICATIONS

Extended European Search Report dated May 24, 2018, in European Patent Application No. 158782185 (8pgs).

(Continued)

*Primary Examiner* — Binh Kien Tieu
(74) *Attorney, Agent, or Firm* — North Weber & Baugh LLP

(57) ABSTRACT

In accordance with embodiments disclosed herein, there are provided apparatus, systems and methods for implementing DSL line fault determination and localization via SELT, DELT, and MELT diagnostics. For example, such a system or computer implemented method may include means for: receiving Metallic Loop/Line Testing (MELT) test output from applying a MELT test to a DSL line; receiving Dual-End Line Testing (DELT) test output from applying a DELT test to the DSL line; receiving Single-Ended Loop Testing (SELT) test output from applying a SELT test to the DSL line; determining one or more faults are present on the DSL line by comparing the MELT test output, the DELT test output, and the SELT test output; and localizing the one or (Continued)

more determined faults by comparing the MELT test output, the DELT test output, and the SELT test output. Other related embodiments are disclosed.

32 Claims, 7 Drawing Sheets

(51) Int. Cl.
    *H04L 12/24*     (2006.01)
    *H04M 3/08*     (2006.01)
    *H04B 3/487*     (2015.01)
    *H04M 3/34*     (2006.01)

(52) U.S. Cl.
    CPC ........ *H04L 41/0677* (2013.01); *H04M 3/085* (2013.01); *H04M 3/34* (2013.01)

(58) Field of Classification Search
    CPC ...... H04M 3/305; H04M 9/08; H04M 3/2254; H04M 3/34; H04B 3/46; H04B 3/23; H04B 3/487; H04B 17/15; H04B 3/464; H04L 12/2878
    USPC ............. 379/1.01, 1.03, 9, 14, 14.01, 10.01, 379/15.01, 22, 22.03, 22.07, 24, 27.01, 379/29.01, 29.03, 29.05, 30
    See application file for complete search history.

(56) References Cited

U.S. PATENT DOCUMENTS

| | | | |
|---|---|---|---|
| 2011/0025343 A1* | 2/2011 | Noessing ................ | H04M 3/30 324/543 |
| 2012/0294348 A1* | 11/2012 | Kuipers ................ | H04M 3/304 375/224 |
| 2013/0010931 A1 | 1/2013 | Berg et al. | |
| 2013/0101093 A1* | 4/2013 | Tennyson .............. | H04M 3/306 379/28 |
| 2013/0223599 A1* | 8/2013 | Drooghaag .............. | H04B 3/46 379/27.01 |
| 2017/0180549 A1* | 6/2017 | Zahedi ..................... | H04B 3/46 |

FOREIGN PATENT DOCUMENTS

| | | | | |
|---|---|---|---|---|
| EP | 2584710 A1 | 4/2013 | | |
| WO | WO-2008048156 A1 * | 4/2008 | ........... | H04M 3/306 |
| WO | 2013154568 A1 | 10/2013 | | |
| WO | 2013154579 A1 | 10/2013 | | |

OTHER PUBLICATIONS

International Search Report dated Oct. 12, 2015, in International PCT Patent Application No. PCT/US15/011470, filed Jan. 14, 2015 (3pgs).

Written Opinion dated Oct. 12, 2015, in International PCT Patent Application No. PCT/US15/011470, filed Jan. 14, 2015 (9pgs).

\* cited by examiner

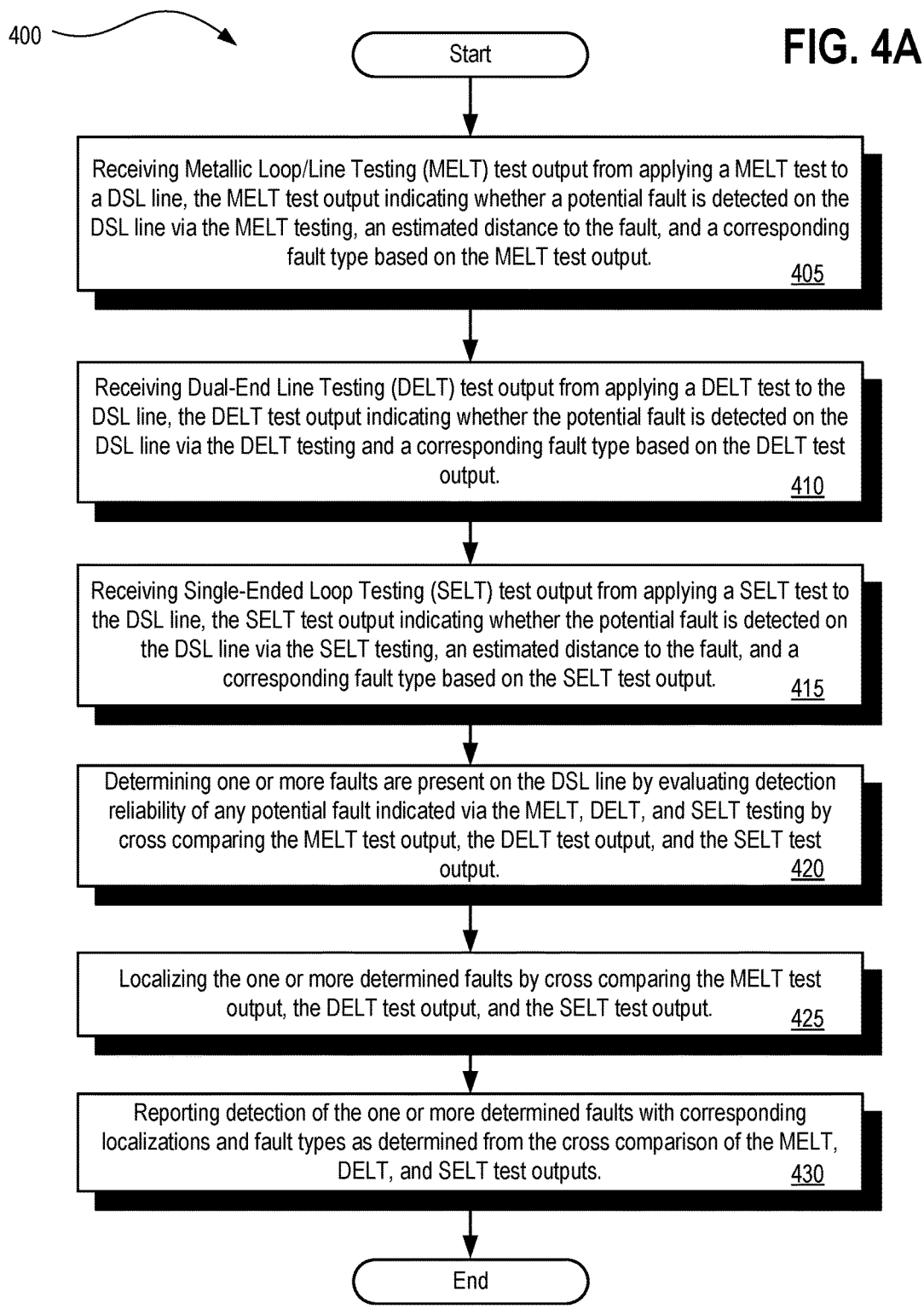

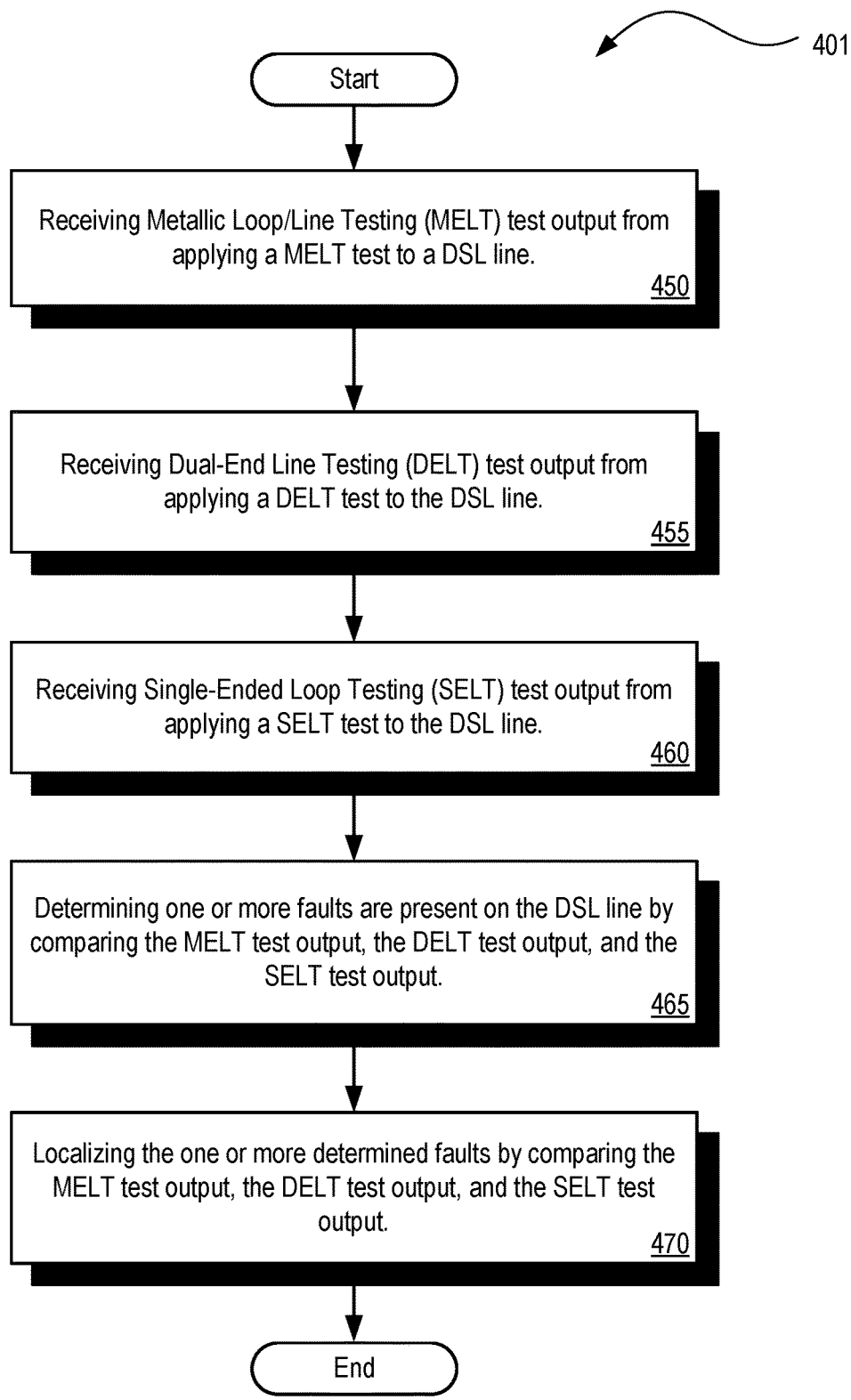

SYSTEMS, METHODS, AND APPARATUSES FOR IMPLEMENTING DSL LINE FAULT DETERMINATION AND LOCALIZATION VIA SELT, DELT, AND MELT DIAGNOSTICS

CROSS-REFERENCE TO RELATED APPLICATIONS

This is a US 371 National Phase Patent Application claiming priority to International PCT Patent Application No. PCT/US2015/011470, titled SYSTEMS, METHODS, AND APPARATUSES FOR IMPLEMENTING DSL LINE FAULT DETERMINATION AND LOCALIZATION VIA SELT, DELT, AND MELT DIAGNOSTICS, naming as inventors Mehdi Mohseni and Ming-Yang Chen, and filed Jan. 14, 2015, which application is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems, methods, and apparatuses for implementing DSL line fault determination and localization via SELT, DELT, and MELT diagnostics.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Conventional solutions for testing and identifying faults on a DSL line are overly simplistic and fail to consistently provide accurate reporting of faults or the most probable result in the event that inconsistent and incompatible data points are received. Moreover, conventional solutions fail to provide appropriate localization of potential faults with the fault reporting.

For instance, conventional Dual-End Line Testing (DELT) testing implementations wholly fail to provide any location or even distance to fault information whatsoever in the event of a cut in the DSL line. Conventional Single-Ended Loop Testing (SELT) testing implementations cannot assess whether a fault is attributable to a modem condition or other fault.

More problematically, in the DSL arts there are most often multiple business entities responsible for different aspects of DSL communication equipment and services, and each defines their scope of responsibility in business terms based on, for example, where a fault is located. However, if a fault cannot be localized to a particular zone of the DSL network, then it may not be possible to readily determine which entity is responsible for rectifying the fault, which in turn leads to excess costs, delay, and ultimately customer dissatisfaction.

The present state of the art may therefore benefit from systems, methods, and apparatuses for implementing DSL line fault determination and localization via SELT, DELT, and MELT diagnostics as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 4A is a flow diagram illustrating a method for implementing DSL line fault determination and localization via SELT, DELT, and MELT diagnostics in accordance with described embodiments;

FIG. 4B is an alternative flow diagram illustrating another method for implementing DSL line fault determination and localization via SELT, DELT, and MELT diagnostics in accordance with described embodiments;

DETAILED DESCRIPTION

Figure 1:
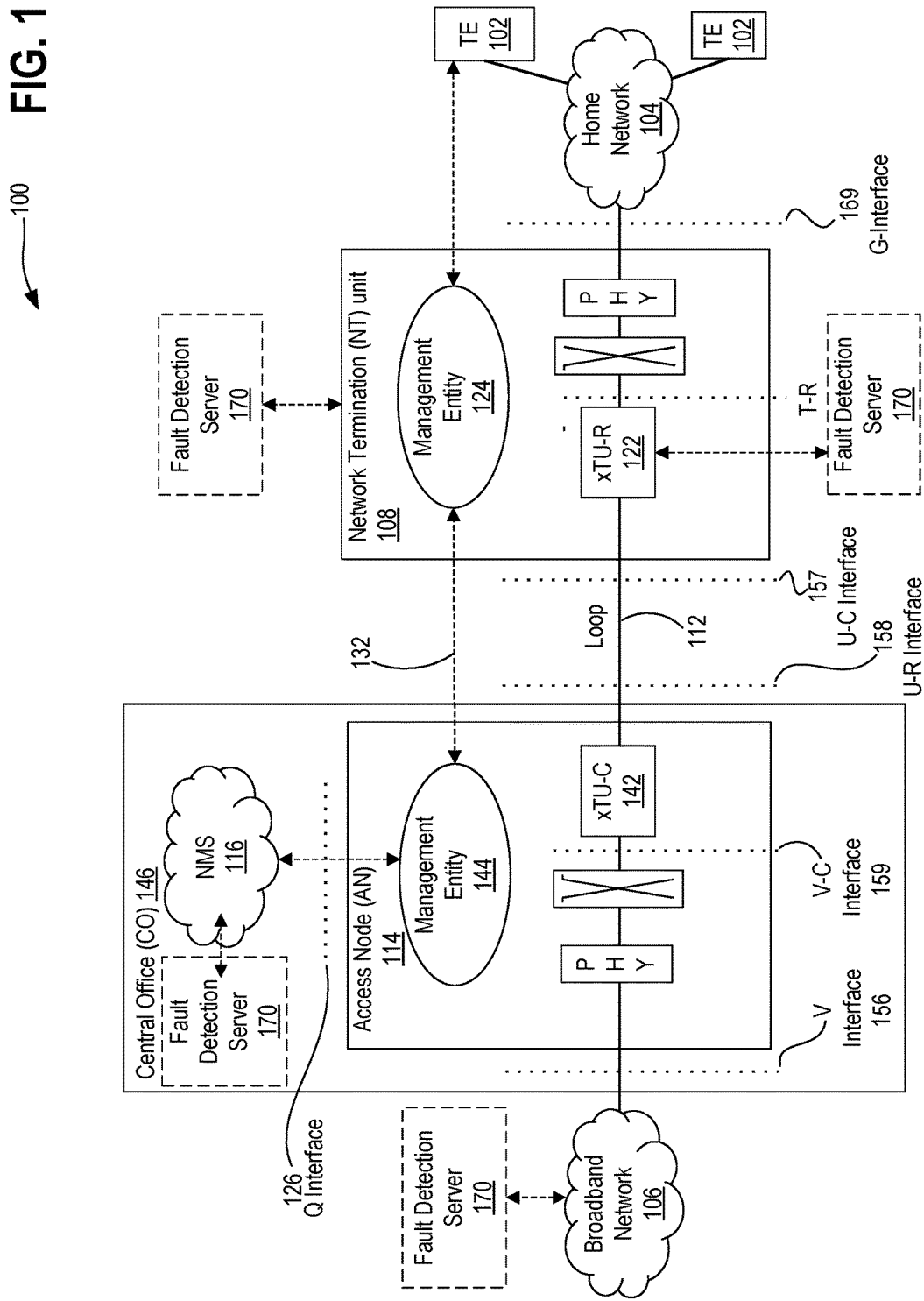
FIG. 1 illustrates an exemplary architecture in which embodiments may operate.

Described herein are apparatuses, systems and methods for implementing DSL line fault determination and localization via SELT, DELT, and MELT diagnostics.

In accordance with one embodiment, an exemplary system or computer implemented method may include, for example, means for receiving Metallic Loop/Line Testing (MELT) test output from applying a MELT test to a DSL line; receiving Dual-End Line Testing (DELT) test output from applying a DELT test to the DSL line; receiving Single-Ended Loop Testing (SELT) test output from applying a SELT test to the DSL line; determining one or more faults are present on the DSL line by comparing the MELT test output, the DELT test output, and the SELT test output; and localizing the one or more determined faults by comparing the MELT test output, the DELT test output, and the SELT test output.

MELT testing provides potential location for some fault types, but not all, whereas SELT will always return a potential fault location and a distance in the event that SELT detects a fault. Comparison of MELT, SELT, and DELT outputs (also referred to as a cross comparison of the MELT, SELT, and DELT outputs) therefore enables more comprehensive and informed analysis of the various detection means in conjunction with consideration of detection reliability for each of the various testing means so as to arrive upon a more accurate and most probable conclusion. For instance, results may be combined in such a way as to enhance the reliability of complementary fault detections or combined in such a way as to permit the ruling in or ruling out of a likely false positive or a likely false negative by the evaluation of the other concurrent testing means applied to a DSL line, thus permitting a detected fault to be confirmed and unreliable results from individual testing means to be ruled out from the final reporting returned subsequent to the analysis which will be described in additional detail below.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+ (G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding, and/or the G.997.1 standard (also known as G.ploam).

In accordance with embodiments described herein, end-user consumers, including residential consumers and business consumers, may connect to the Internet by way of a Wide Area Network (WAN) backhaul connection to a Service Provider (SP), such as an Internet Service Provider (ISP), or to a Service Provider that provides one or more of data connectivity, voice connectivity, video connectivity, and mobile device connectivity to a plurality of subscribers. Such Service Providers may include a Digital Subscriber Line (DSL) internet service provider which provides its subscribing end-users with Internet bandwidth at least partially over copper twisted pair telephone lines, such as that conventionally utilized to carry analog telephone service (e.g., Plain Old Telephone Service (POTS); a coaxial cable internet service provider which provides end-users with Internet bandwidth at least partially over coaxial cable, such as that conventionally utilized to carry "cable" television signals; or a fiber optics internet service provider which provides end-users with Internet bandwidth at over fiber optic cable that terminates at a customer's premises. Other variants exist as well, such as ISPs which provide Internet bandwidth as an analog signal over an analog telephone based connection, ISPs that provide Internet bandwidth over a one-way or two-way satellite connection, and ISPs that provide Internet bandwidth at least partially over power lines, such as power lines conventionally utilized to transmit utility power (e.g., electricity) to an end-user's premises, or ISPs that provide Internet bandwidth at least partially over wireless channels, such as wireless (e.g., WiFi) connectivity at hotspots, or mobile data connectivity via technologies and standards such as WiMax, 3G/4G, LTE, etc.

The G.997.1 standard specifies the physical layer management for ADSL transmission systems based on the clear, Embedded Operation Channel (EOC) defined in G.997.1 and use of indicator bits and EOC messages defined in the G.992.x, G.993.x and G.998.4 standards. Moreover, G.997.1 specifies network management elements content for configuration and performance management. In performing the disclosed functions, systems may utilize a variety of operational data (which includes performance data) that is available at an Access Node (AN).

In FIG. 1, user's terminal equipment (TE) 102 (e.g., a Customer Premises Equipment (CPE) device or a remote terminal device, network node, LAN device, etc.) is coupled to a home network 104, which in turn is coupled to a Network Termination (NT) Unit 108. Multiple xTU devices ("all Transceiver Unit" devices) are further depicted. An xTU provides modulation for a DSL loop or line (e.g., DSL, ADSL, VDSL, etc.). In one embodiment, NT unit 108 includes an xTU-R (xTU Remote) 122 (for example, a transceiver defined by one of the ADSL or VDSL standards), or any other suitable network termination modem, transceiver or other communication unit. NT unit 108 also includes a Management Entity (ME) 124. Management Entity 124 may be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program; via Transaction Language 1 (TL1) commands, TL1 being a long-established command language used to program responses and commands between telecommunication network elements; or via a TR-69 based protocol. "TR-69" or "Technical Report 069" is in reference to a DSL Forum technical specification entitled CPE WAN Management Protocol (CWMP) which defines an application layer protocol for remote management of end-user devices. XML or "eXtended Markup Language" compliant programming and interface tools may also be used.

Each xTU-R 122 in a system may be coupled with an xTU-C (xTU Central) in a Central Office (CO) or other central location. The xTU-C 142 is located at an Access Node (AN) 114 in Central Office (CO) 146. A Management Entity 144 likewise maintains an MIB of operational data pertaining to xTU-C 142. The Access Node 114 may be coupled to a broadband network 106 or other network, as will be appreciated by those skilled in the art. Each of xTU-R 122 and xTU-C 142 are coupled together by a U-interface/loop 112, which in the case of ADSL may be a twisted pair line, such as a telephone line, which may carry other communication services besides DSL based communications.

Several of the interfaces shown in FIG. 1 are used for determining and collecting operational data. The Q interface 126 provides the interface between the Network Management System (NMS) 116 of the operator and Management Entity 144 in Access Node 114. Parameters specified in the G.997.1 standard apply at the Q interface 126. The near-end parameters supported in Management Entity 144 may be derived from xTU-C 142, while far-end parameters from xTU-R 122 may be derived by either of two interfaces over the U-interface. Indicator bits and EOC messages may be sent using embedded channel 132 and provided at the Physical Medium Dependent (PMD) layer, and may be used to generate the required xTU-R 122 parameters in Management Entity 144. Alternately, the Operations, Administration and Maintenance (OAM) channel and a suitable protocol may be used to retrieve the parameters from xTU-R 122 when requested by Management Entity 144. Similarly, the far-end parameters from xTU-C 142 may be derived by either of two interfaces over the U-interface. Indicator bits and EOC message provided at the PMD layer may be used to generate the required xTU-C 142 parameters in Management Entity 124 of NT unit 108. Alternately, the OAM channel and a suitable protocol may be used to retrieve the parameters from xTU-C 142 when requested by Management Entity 124.

At the U-interface (also referred to as loop 112), there are two management interfaces, one at xTU-C 142 (the U-C interface 157) and one at xTU-R 122 (the U-R interface 158). The U-C interface 157 provides xTU-C near-end parameters for xTU-R 122 to retrieve over the U-interface/loop 112. Similarly, the U-R interface 158 provides xTU-R near-end parameters for xTU-C 142 to retrieve over the U-interface/loop 112. Interfaces V 156 and V-C 159 are further depicted within the CO 146 at different points of the loop 112. Interface G at element 169 is connected between the home network 104 and the Network Termination unit 108. The parameters that apply may be dependent upon the transceiver standard being used (for example, G.992.1 or G.992.2). The G.997.1 standard specifies an optional Operation, Administration, and Maintenance (OAM) communication channel across the U-interface. If this channel is implemented, xTU-C and xTU-R pairs may use it for transporting physical layer OAM messages. Thus, the xTU transceivers 122 and 142 of such a system share various operational data maintained in their respective MIBs.

Depicted within FIG. 1 is fault detection server 170 operating at various optional locations in accordance with several alternative embodiments. For example, in accordance with one embodiment, fault detection server 170 is communicably interfaced through broadband network 106, for instance, through a public Internet, VPN, or other network utilized to reach DSL networking equipment. For instance, fault detection server 170 need not be co-located with the DSL network equipment in order to provide fault detection and localization services. Such a fault detection server 170 may therefore operate within the "cloud," for instance, at a remote hosted computing facility in which the server resides in a first location and the DSL networking equipment resides at a second location, and each is connected over a long distance via appropriate networking technology. Such a cloud service provider may provide the DSL fault detection and localization services as a third party provided service for a fee to either a DSL network operator or a DSL network services provider, or both. In other embodiments, fault detection server 170 operates within the Central Office 146 and is communicably interfaced through NMS 116 or fault detection server 170 may operate outside of the Central Office 146 and be communicably interfaced either to NT 108 or interfaced into the xTU-R 122 within NT 108.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For example, Public Switched Telephone Network (PSTN) used to provide DSL services to customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.993.5 for DSL modems supporting Vectoring, I.T.U. standard G.998.4 for DSL modems supporting retransmission functionality, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services and it should be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

Figure 2:
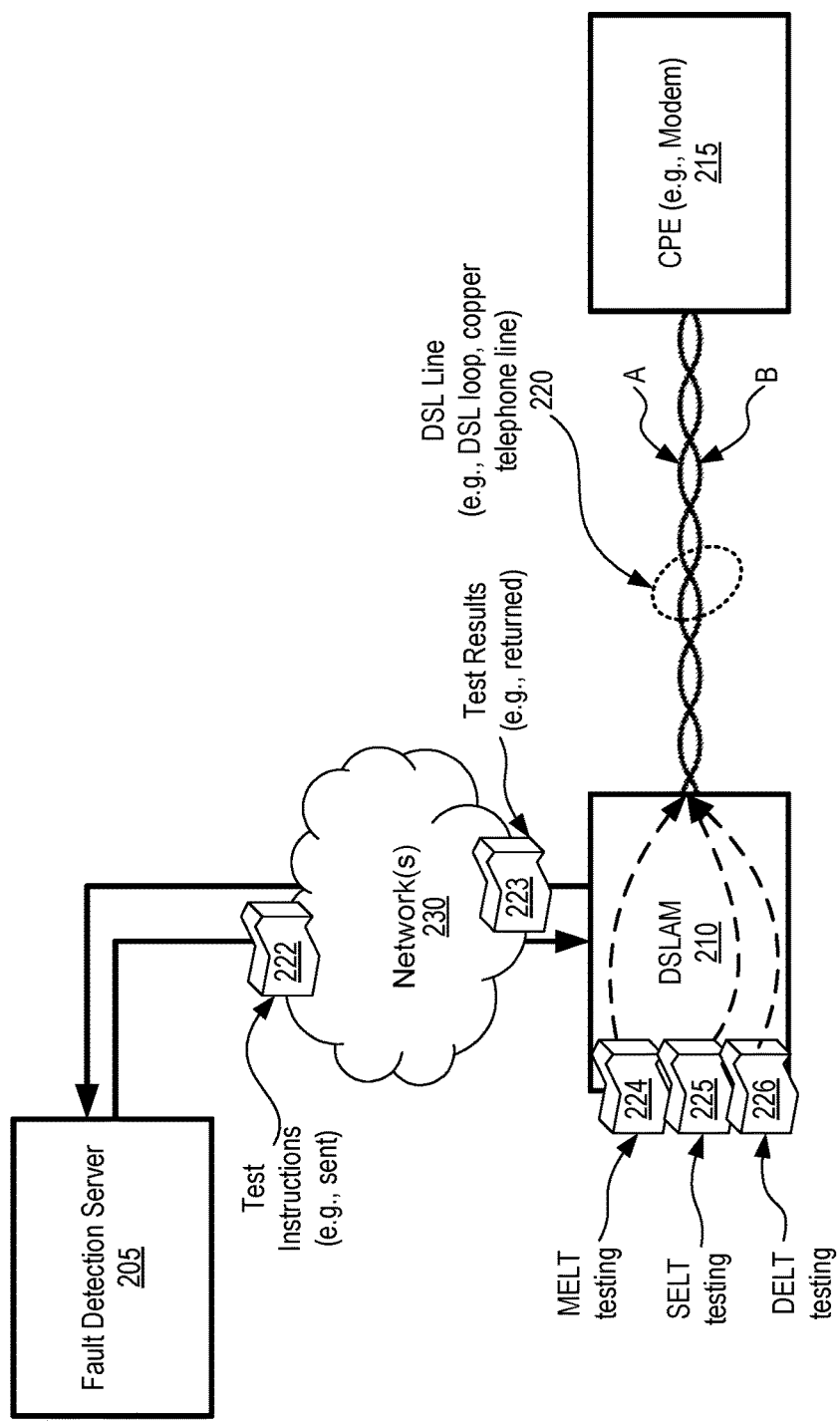
FIG. 2 depicts an exemplary architecture in accordance with described embodiments.

FIG. 2 depicts an exemplary architecture 200 in accordance with described embodiments. Depicted is the fault detection server 205 which is connected through network(s) 230 to a DSLAM 210 which in turn is communicably interfaced to a CPE (e.g., a modem) 215 via DSL line (e.g., DSL loop or copper telephone line) 220. Note that DSL line 220 is a twisted pair copper telephone line as depicted here with both "A" and "B" components. Further depicted are test instructions 222 being sent from fault detection server 205 to DSLAM over network 230 and test results 223 being returned from DSLAM 210 over network 230 to the fault detection server 205. Test instructions 222 may cause DSLAM to apply MELT testing 224, SELT testing 225, and DELT testing 226 to the DSL line 220 via the DSLAM 210. According to an alternative embodiment, the test instructions 222 may cause CPE equipment to apply the MELT, DELT and SELT measurements within the CPE equipment and from the CPE side rather than having the MELT, DELT and SELT measurements applied via the DSLAM. A simplified view is depicted here, however, there may be many instances of CPE 215 devices, such as many customer modems, and there may be numerous DSLAM 210 devices deployed into the field. Additionally, it is possible that the fault detection server 205 is located remotely from any given DSLAM 210, but not necessarily. For instance, fault detection server may be located near or located with a DSLAM 210 and function the same, including communicating with the DSLAM over a network, such as a Local Area Network (LAN) rather than via a Wide Area Network (WAN), or VPN (Virtual Private Network), or a public Internet.

According to the described embodiments, the fault detection server 205 applies MELT/SELT/DELT testing and measurements as a group (although not necessarily all at once as the differing tests could disrupt one another) to obtain MELT/SELT/DELT testing results which are then analyzed and evaluated as a group through cross comparison. Use of MELT/SELT/DELT testing and measurements as a group helps to overcome deficiencies in prior solutions, even those which utilize any of MELT, SELT, or DELT testing. No prior DSL fault detection and localization solutions are currently available to the marketplace which utilize and apply MELT/SELT/DELT testing and measurements as a group in the manner described herein.

Consider for example the problems with each of SELT and DELT testing as applied in prior solutions. For instance, given a cut in the line, SELT returns a reflection, but it is unknown the status of the modem. DELT on the other hand is wholly unavailable where a cut is present in the DSL loop, and as such, no information is returned as it pertains to loop length, much less localization of any particular fault or description of a fault type.

Problematically, responsibility for a given fault may be different based upon the localization of the fault itself, and determining responsibility may take time, cause delay, excess cost, and ultimately frustration for the end customer who may be suffering from an outage or poor service. For instance, an Incumbent Local Exchange Carrier (ILEC) or a Competitive Local Exchange Carrier (CLEC) may have differing liabilities for the DSL line based upon where the fault exists within the DSL network or within the customer's premises.

Worse yet, a CLEC entity likely will not have access to loop length configuration, topology, terminals, etc., whereas the ILEC may likely possess such information but may or may not share the information with other business entities.

MELT testing can provide side information such as distance, but in isolation is not sufficient. Take for example another example where there is not a cut on the DSL line and the DSL modem is correctly connected, thus making DELT testing available, but DELT determines that the line cannot synchronize properly. Neither MELT testing nor DELT testing can provide the two key information elements for fault detection, identification, and localization, so as to enable appropriate repair to the DSL line. Specifically, it is needed to first detect a fault on a DSL line and secondly it is necessary to localize the fault, for instance, relative to the DSL loop length or distance to the fault, etc. SELT testing can locate a fault but cannot identify the end of the loop. DELT provides some indication of loop length, but with inconsistencies which must be compensated for.

Accordingly, application by the fault detection server 205 of MELT/SELT/DELT testing and measurements as a group to obtain MELT/SELT/DELT testing results which are then analyzed and evaluated as a group through cross comparison overcomes these various deficiencies and enables more accurate, comprehensive, and generally improved fault detection and localization for the DSL line.

Figure 3:
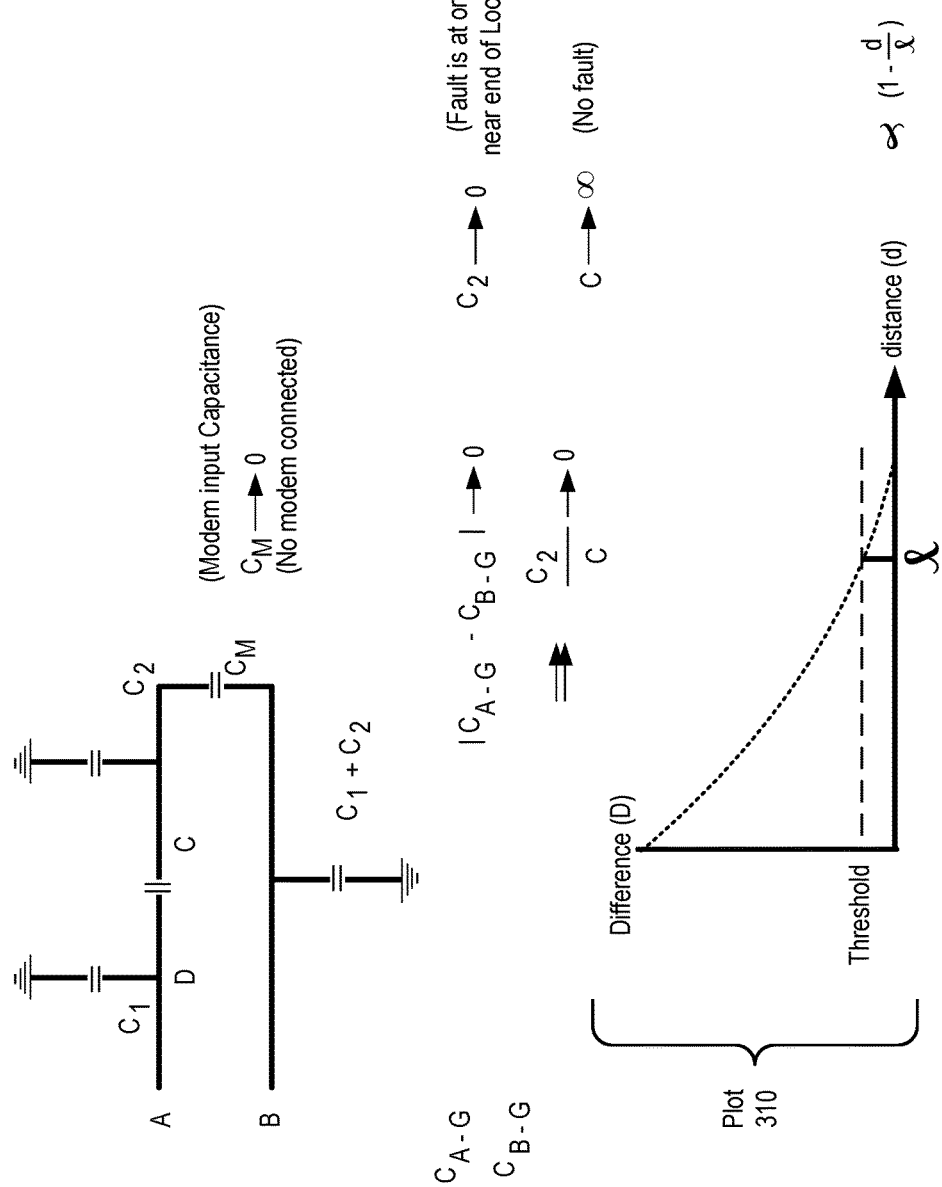
FIG. 3 depicts various measurements obtained in accordance with described embodiments.

FIG. 3 depicts various measurements 300 obtained in accordance with described embodiments. For instance, it is possible to estimate loop length as a function of cable gauge via DELT testing, but this estimation may be inaccurate due to a fault on the DSL line. SELT will provide "d" distance to a fault, which is usually accurate, but may not be useful for localizing the fault in the case the loop length is not accurate. Gauge estimation tools may further inform the analysis but are known to return inaccurate results when a fault is present and may thus be considered but should be used with suspicion. MELT is helpful for detection of a fault, especially if there is no DELT testing available. For instance, where DELT returns a no result or is simply not available then MELT may be utilized to identify loop termination. MELT can provide an alternative estimate for the loop length, or as it will be described in the following, it can provide an indication for the location of the fault with respect to the end of the loop for a capacitive series fault (a cut or a bad splice). MELT testing which applies metallic loop testing via low frequency or DC measurements of the capacitance (C) provides measurements of C of A (component "A" of DSL line 220) to ground (G) and capacitances of each of the pairs to ground and can measure C of A to B (component "B" of DSL line 220) and C of A to G and C of B to G, and can further measure resistance (R) of A to G and R of B to G and R of A to B, and B to A.

Signature detection at A to B and B to A is the same and is indicative that the loop is good through to the end, to the Network Interface Device (NID). Any fault after the NID would likely be the responsibility of the home owner or business owner whereas any fault preceding the NID is the responsibility of the network operator. Low 25 Hz AC measurements are applied for signature detection which detects signatures with a capacitor. Measurements are also obtained with two amplitudes to detect a signature with back to back Zener diodes or a "thyrector" which allows the current to flow on both forward and backward directions with a high enough voltage amplitude but operates like an open circuit for low voltage amplitude. Characteristic volt of a current with large amplitude may thus be observed in which it is seen to pass but with low amplitude it is seen as open and thus does not pass. Another type of signature with a diode passes current in one direction but blocks the current in the opposite resulting in R_BA being open or infinite while R_AB has a value. Thus, according to a particular embodiment, detecting different signatures includes evaluating MELT test output for a MELT test signature at an end of the DSL loop communicably interfaced to a Network Interface Device (NID) by: (i) comparing tip-to-ring and ring-to-tip resistance measurements returned by the MELT test output; (ii) analyzing AC conductance and susceptance measurements returned by the MELT test output; (iii) analyzing measurements with different test voltage amplitudes returned by the MELT test output; or (iv) any combination of (i), (ii), and (iii).

Of particular note via the MELT testing are the DC measurements listed, C of A to G, and C of B to G. More particularly, when DELT is wholly unavailable it is beneficial to understand via MELT whether a fault is detected whereas DELT simply returns a no result. Although the no result via DELT in isolation is not particularly informative, when utilized in conjunction with the other testing means, the no result by DELT can be utilized via the analysis module or analysis functionality of the fault detection server 205 in identifying the most probable fault condition, for instance, to determine if the DELT testing returns no result because there is no reply from a modem due to the modem being faulty or not in synchronization or because, alternatively, there is a fault on the DSL line.

Series and shunt type faults are of particular interest for the testing methodologies described in which each of MELT, DELT, and SELT testing are applied as a group to identify and localize these kinds of fault conditions on a DSL line with respect to the end of the DSL loop.

Take for example a condition where there is a capacitive fault C in series with one of the pairs (this fault will become a cut when C goes to zero), thus indicating a bad connection. By applying MELT test and measuring C of A to Ground (G) and C of B to G and identifying an absolute value is very near zero, then it may be determined that C2 over C should go to zero and thus, a fault is either present at the end of the loop or very near to the end of the loop (C2 very small) or it may be deduced that a no fault condition is present (C goes to infinity). A bad splice fault can be confirmed through additional DELT measurement, or if MELT is applied and a signature is present at the end of the loop, by checking whether the signature is observed. If MELT does not detect a bad splice, DELT is not available (for example in the case of a cut) and there is no signature at the end of the loop, then further input from a customer may be sought to identify whether the modem is connected properly, and if so, then it may be correctly presumed that a fault is present on the DSL line and it is located at the end of the loop and prevents the DSL line to operate.

As depicted at element 310, plotting the Difference (D) for distance (d) then it can be observed that the smaller the number then the further out the fault is from the end of the DSL loop and at the end of the line. Therefore, if the value is larger than a given threshold then the fault is nearer to the CO whereas a smaller number is indicative that the fault is nearer to the NID or customer premises.

Some information for localization of the fault may be obtained independent of SELT and DELT testing as side information to improve the fault localization.

Alternatively, where the difference is large than the fault may be presumed to reside within the DSL network and thus, SELT may be utilized to give the distance to the fault which is sufficiently accurate for the CLEC to assess the fault and escalate to the DSL line owner based on an approximated distance of the fault from the CO.

Application of the MELT testing and plotting the difference for Distance (d) enables verification that a fault exists and then providing sufficient localization to determine the distance of that fault from the CO so as to determine liability for correcting the fault, for instance, to one of: (i) a DSL line owner, (ii) a CLEC providing DSL services to customers but not having ownership of the DSL line, or (iii) an end user which is responsible of the wiring and DSL modem within a given customer premises.

FIG. 4A is a flow diagram illustrating a method 400 for implementing DSL line fault determination and localization via SELT, DELT, and MELT diagnostics in accordance with described embodiments. Method 400 may be performed by processing logic that may include hardware (e.g., circuitry, dedicated logic, programmable logic, microcode, etc.), software (e.g., instructions run on a processing device) to perform various operations such as managing, controlling, analyzing, collecting, generating, monitoring, diagnosing, executing, presenting, receiving, interfacing, communicating, receiving, transmitting, processing, providing, determining, triggering, displaying, retrieving, updating, sending, returning, etc., in pursuance of the systems and methods as described herein. For example, fault detection server 170 as depicted at FIG. 1, the fault detection server 205 as depicted at FIG. 2, the system 500 (e.g., fault detection server) at FIG. 5, or the machine 600 at FIG. 6, may implement the described methodologies. Some of the blocks and/or operations listed below are optional in accordance with certain embodiments. The numbering of the blocks presented is for the sake of clarity and is not intended to prescribe an order of operations in which the various blocks must occur.

Method 400 begins at block 405 with processing logic for receiving Metallic Loop/Line Testing (MELT) test output from applying a MELT test to a DSL line, the MELT test output indicating whether a potential fault is detected on the DSL line via the MELT testing, an estimated distance to the fault, and a corresponding fault type based on the MELT test output.

At block 410, processing logic receives Dual-End Line Testing (DELT) test output from applying a DELT test to the DSL line, the DELT test output indicating whether the potential fault is detected on the DSL line via the DELT testing and a corresponding fault type based on the DELT test output.

At block 415, processing logic receives Single-Ended Loop Testing (SELT) test output from applying a SELT test to the DSL line, the SELT test output indicating whether the potential fault is detected on the DSL line via the SELT testing, an estimated distance to the fault, and a corresponding fault type based on the SELT test output.

At block 420, processing logic determines one or more faults are present on the DSL line by evaluating detection reliability of any potential fault indicated via the MELT, DELT, and SELT testing by cross comparing the MELT test output, the DELT test output, and the SELT test output.

At block 425, processing logic localizes the one or more determined faults by cross comparing the MELT test output, the DELT test output, and the SELT test output.

At block 430, processing logic reports detection of the one or more determined faults with corresponding localizations and fault types as determined from the cross comparison of the MELT, DELT, and SELT test outputs.

Although DELT alone does not produce an estimated distance to the fault via its test outputs, localization functionality as implemented by the described means may nevertheless reference or rely upon DELT test outputs as one of the sources specifically for localizing the determined fault by cross comparing the MELT test output, the DELT test output, and the SELT test output. Despite the fact that the DELT test output in of itself does not contain distance information, the DELT test output may nevertheless be utilized for localizing a fault by the fault type, for instance, by detecting the presence of crosstalk or FEXT (far-end-crosstalk) that is occurring within the DSL cable and within the DSL network. In such instances, it may be that the location information using such a methodology in isolation lacks sufficient accuracy, but, it does nevertheless provide some guidance, insight, or general idea where the fault is occurring for the sake of localization and will thus aid in identifying appropriate remedies. Another example using the DELT test outputs for the sake of localization is with regard to bridge tap detection, in which case it is possible to estimate the length of the tap from DELT test output, but not the location with any specificity. However, the length of the tap does contain some information on the location of the fault and thus may be utilized to improve, inform, and otherwise aid in localization functionality of the fault. For instance, a short tap will most probably be located inside a customer's premise while a long tap conversely is will highly likely be located within the DSL network, somewhere prior to the DSL customer's premises.

FIG. 4B is an alternative flow diagram illustrating another method 401 for implementing DSL line fault determination and localization via SELT, DELT, and MELT diagnostics in accordance with described embodiments.

Method 401 begins at block 450 with processing logic for receiving Metallic Loop/Line Testing (MELT) test output from applying a MELT test to a DSL line.

At block 455, processing logic receives Dual-End Line Testing (DELT) test output from applying a DELT test to the DSL line.

At block 460, processing logic receives Single-Ended Loop Testing (SELT) test output from applying a SELT test to the DSL line.

At block 465, processing logic determines one or more faults are present on the DSL line by comparing the MELT test output, the DELT test output, and the SELT test output.

At block 470, processing logic localizes the one or more determined faults by comparing the MELT test output, the DELT test output, and the SELT test output.

Other functions, operations, and methodologies may be utilized in combination with either of the depicted methods 400 and 401 in accordance with the embodiments described herein.

According to another embodiment of methods 400 and 401, the MELT test output indicates a potential fault is detected on the DSL line via the MELT testing, an estimated distance to the fault, and a corresponding fault type based on the MELT test output; in which the DELT test output indicates the potential fault is detected on the DSL line via the DELT testing and a corresponding fault type based on the DELT test output; and in which the SELT test output indicates the potential fault is detected on the DSL line via the SELT testing, an estimated distance to the fault, and a corresponding fault type based on the SELT test output.

According to another embodiment of method 400 and 401, determining the one or more faults includes: evaluating detection reliability of any potential fault indicated via the MELT, DELT, and SELT testing by comparing the MELT test output, the DELT test output, and the SELT test output.

According to another embodiment, method 400 and 401 further includes: reporting detection of the one or more determined faults with corresponding localizations and fault types as determined from the comparison of the MELT, DELT, and SELT test outputs.

According to another embodiment, method 400 and 401 further includes: providing a list of physical layer fault types for the DSL line; and providing a correlation between observable measurements on the DSL line via the MELT, DELT, and SELT testing and the list of physical layer fault types for the DSL line.

For instance, each of the various tests, MELT, DELT, and SELT, provide a list of potential fault types on the line depending on what is observed within the measurements. The provided list may even be empty, for instance, if there are simply no faults or no fault detected, or the list may consist of a single fault or may consist of multiple such faults in the event that multiple faults are present and detected by the respective test on the DSL line.

Moreover, the same or similar fault may present itself or be recorded within the respective outputs of the various tests. Further still, each of the tests' results output may be utilized to rule in or rule out other faults based on the particular results. According to certain embodiments, a priori knowledge on the detection reliability of each test is further provided as well a priori knowledge on the detection reliability of the different faults.

According to another embodiment of method 400 and 401, the correlation between observable measurements on the DSL line correlates measurements recorded in any of the MELT test output, the DELT test output, and the SELT test output with any of the physical layer fault types for the DSL line including: (i) a no fault result, (ii) a single fault result, or (iii) a multiple fault result for the DSL line.

According to another embodiment of method 400 and 401, the MELT, DELT, and/or SELT test outputs received exhibit a complementary fault result in which two or more of the MELT, DELT, or SELT test outputs indicate potential faults and corresponding fault types that are logically and permissibly present on the DSL line at the same time according to the provided correlation between observable measurements on the DSL line and the list of physical layer fault types for the DSL line; and in which determining the fault is present on the DSL line includes accepting the complementary fault result based on the provided correlation between observable measurements on the DSL line the list of physical layer fault types for the DSL line.

According to another embodiment of method 400 and 401, the MELT, DELT, and/or SELT test outputs received exhibit complementary fault results in which (i) the DELT test output indicates a bridge tap, further in which (ii) the MELT test output and the SELT test output both indicate a bad splice; and in which MELT, DELT, or SELT test outputs are determined to exhibit the complementary fault results based on each of the bridge tap indicated via the DELT test output and the bad splice indicated by each of the MELT and SELT test outputs being logically compatible simultaneously on the DSL line based on the according to the provided correlation between observable measurements on the DSL line and the list of physical layer fault types for the DSL line.

According to another embodiment, method 400 and 401 further includes: providing an advanced measure (an "a priori measure") of detection reliability for each of a plurality of physical layer fault types returnable by any one or more of the MELT, DELT, and SELT tests.

According to another embodiment of method 400 and 401, the MELT, DELT, and/or SELT test outputs received exhibit a redundant fault result in which two or more of the MELT, DELT, or SELT test outputs indicate the same potential fault detected on the DSL line and the same corresponding fault type; in which determining the fault is present on the DSL line includes accepting the redundant fault result based on the advanced measure of the detection reliability and the provided correlation between observable measurements on the DSL line and the list of physical layer fault types for the DSL line.

According to another embodiment of method 400 and 401, the MELT, DELT, and/or SELT test outputs received exhibit a contradictory fault result in which two or more of the MELT, DELT, or SELT test outputs indicate potential faults and corresponding fault types that cannot logically be present on the DSL line at the same time according to the provided correlation between observable measurements on the DSL line and the list of physical layer fault types for the DSL line; and in which determining the fault is present on the DSL line includes resolving the contradictory fault result by ruling in or ruling out one of the potential faults and corresponding fault types indicated by the MELT, DELT, or SELT test outputs based on the advanced measure of the detection reliability for each the physical layer fault types returnable by any one or more of the MELT, DELT, and SELT testing.

For example, given a pre-defined list of fault types, the fault determined to be the most probable based upon the given measurements is selected as the fault, even where the data, test output, and other indicators are not wholly in agreement. Detection reliability therefore provides guidance in the face of contradictory results that are returned or obtained from individual tests. For instance, using a priori information for the detection reliability described above it is possible to rule out unreliable detections, especially unreliable and contradictory detections such that the more probable and therefore more accurate result is selected and identified in the results set or detection reporting returned.

In other instances, results may not be contradictory at all, but rather, multiple results from the various tests' output may indeed be complementary, meaning that a certain fault which may be detectable by only one test and not by others the others, yet does not contradict the results of the other tests. Consequently, combining the results from the multiple tests increases the detection reliability and also improves fault type coverage.

According to another embodiment of method 400 and 401, ruling in or ruling out one of the potential faults and corresponding fault types indicated by the MELT, DELT, or SELT test outputs based on the advanced measure of the detection reliability for each the physical layer fault types returnable by any one or more of the MELT, DELT, and SELT testing includes one or both of: accepting one of the potential faults and corresponding fault types indicated by the MELT, DELT, or SELT test outputs according to which has the greatest advanced measure of the detection reliability; and negating one of the potential faults and corresponding fault types indicated by the MELT, DELT, or SELT test outputs according to which has the lesser advanced measure of the detection reliability.

According to another embodiment of method 400 and 401, the MELT, DELT, and/or SELT test outputs received exhibit a contradictory fault result in which: (i) the SELT test output indicates a bad splice type fault on the DSL line, further in which (ii) the MELT test output indicates an absence of the bad splice type fault on the DSL line, and lastly in which (iii) the DELT test output indicates the absence of the bad splice type fault on the DSL line; in which the SELT test output is in contradiction to the MELT test output and the DELT test output according to the provided correlation between observable measurements on the DSL line and the list of physical layer fault types for the DSL line; and in which the method further includes resolving the contradictory fault result by ruling in the DELT test output based on the advanced measure of the detection reliability indicating the DELT test output for the bad splice type fault on the DSL line having a greater detection reliability value than the advanced measure of the detection reliability for the bad splice type fault on the DSL line as indicated by the SELT test output. Thus, a bad splice as indicated by each of SELT and DELT but in the absence of a corresponding bad splice type fault indicated by the MELT produces a type of a contradictory result which may systematically be resolved to identify the correct and most probable result.

According to another embodiment of method 400 and 401, localizing the determined fault by comparing the MELT test output, the DELT test output, and the SELT test output includes one of: (i) accepting the estimated distance to the fault as indicated by the MELT test output and the estimated distance to the fault as indicated by the SELT test output when the MELT and SELT test outputs are redundant or within a threshold range of one another; (ii) resolving a contradictory fault result in the estimated distance to the fault as indicated by the MELT and SELT test outputs by ruling in or ruling out one of the MELT or SELT test outputs based on an advanced measure of the localization reliability for each the estimated distances to the fault returnable by the MELT or SELT testing; and (iii) identifying at least two potential faults and localizations to the at least two potential faults, in which the MELT, DELT, and/or SELT test outputs received indicate the at least two potential faults as complementary fault results within the MELT, DELT, and/or SELT test outputs that are logically and permissibly present on the DSL line at the same time according to the provided correlation between observable measurements on the DSL line and the list of physical layer fault types for the DSL line, and accepting an estimated distance to each of the at least two potential faults as indicated by the MELT, DELT, and/or SELT test outputs.

Although the above description makes reference to a "fault" or the "fault" or the "potential fault," it should be understood that there is always the possibility of the MELT, DELT, and SELT testing and test outputs detecting and identifying multiple faults. Detection of such multiple faults is an advantage of the advanced assessment of reliability of the localization information in the event that conflicting data or conflicting fault detection arises or in the event that multiple non-conflicting and thus, complementary faults are identified.

In the context of fault localization, the fault location provided by SELT, the fault location or the loop length provided by MELT, and the loop length from DELT or loop records is specifically taken into consideration to determine the most appropriate location for the fault or faults. Similar to the above with respect to what fault and fault type, there are multiple measurements for the fault location and the loop length, which may be complementary or may sometimes be contradictory, and thus, require the selection of the most probable and thus, the most accurate.

According to another embodiment, method 400 and 401 further includes: retrieving a recorded line length for the DSL line from database; in which localizing the potential fault includes comparing MELT and SELT loop lengths or distances to the potential fault and DELT loop lengths returned with the MELT, SELT, and DELT test outputs respectively and further updating the localization based on the recorded line length for the DSL line. Further in such an embodiment, localizing the potential fault includes localizing the potential fault to a geographic distance from an end of the DSL loop or to a geographic location relative to the end of the DSL loop.

With respect to localization, the distance to the fault and also the loop length are both taken into account to determine specifically where the fault is located relative to the end of the DSL loop which may then be translated into a geographic location or map coordinates, for instance, to deploy a repair person. The distance to the fault may be determined from SELT as well as MELT and the loop length may be determined from MELT as well as DELT, but also from a loop inventory, such as a database of loop lengths known in advance for the various DSL lines/loops making up a DSL network.

For instance, MELT and SELT loop lengths or MELT and SELT distances to an identified fault may be utilized, as provided within the corresponding test outputs or the loop length database information or both, and each may inform and improve the other or in certain instances where, for example, a loop length inventory is not available, then the MELT and SELT outputs may be relied upon exclusively along with certain kinds of DELT information as described previously, such as detection of FEXT as well as bridge tap detection and length of the bridge tap on a DSL line.

According to another embodiment of method 400 and 401, the MELT test output indicating the potential fault and the corresponding fault type is based on a measurement of one or more of: tip-to-ring resistance; ring-to-tip resistance; tip-to-ground resistance; ring-to-ground resistance; tip-to-ring capacitance; tip-to-ground capacitance; ring-to-ground capacitance; tip-to-ring conductance and susceptance; tip-to-ground conductance and susceptance; ring-to-ground conductance and susceptance; AC foreign current on tip; AC foreign current on ring; DC foreign current on tip; DC foreign current on ring; tip-to-ring AC voltage; tip-to-ground AC voltage; ring-to-ground AC voltage; tip-to-ring DC voltage; tip-to-ground DC voltage; and ring-to-ground DC voltage.

According to another embodiment of method 400 and 401, the SELT test output indicating the potential fault and the corresponding fault type is based on a measurement of one or more of: an Uncalibrated Echo Response (UER) per sub-carrier, an Uncalibrated Echo Response (UER) measurement variance per sub-carrier, calibration data for obtaining a Calibrated Echo Response per sub-carrier, and a Quiet Line Noise (QLN) measurement per sub-carrier; and further in which the DELT test output indicating the potential fault and the corresponding fault type is based on a measurement of one or more of: a Signal to Noise Ratio (SNR) per sub-carrier, insertion loss in logarithmic scale (HLOG) per sub-carrier, actual transmit Power Spectral Density (PSD) per sub-carrier, fine gains per sub-carrier, and a Quiet Line Noise (QLN) measurement per sub-carrier.

According to another embodiment of method 400 and 401, the MELT test output further indicates a MELT test signature at an end of the DSL loop communicably interfaced to a Network Interface Device (NID) by: (i) comparing tip-to-ring and ring-to-tip resistance measurements returned by the MELT test output; (ii) analyzing AC conductance and susceptance measurements returned by the MELT test output; (iii) analyzing measurements with different test voltage amplitudes returned by the MELT test output; or (iv) any combination of (i), (ii), and (iii).

For instance, MELT test output may further indicate a MELT test signature at an end of the DSL loop communicably interfaced to a Network Interface Device (NID) by comparing tip-to-ring and ring-to-tip resistance measurements returned by the MELT test output, or by analyzing AC measurements, including conductance and susceptance measurements, as returned by the MELT test output, or by analyzing measurements with different test voltage amplitudes returned by the MELT test output, some combination thereof. Take for example, the detection a signature which is only possible by comparing tip-to-ring and ring-to-tip resistance measurements, or by analyzing conductance and susceptance measurements, so as to narrow the localization of a fault to the end of the DSL loop as communicably interfaced to the NID.

According to another embodiment of method 400 and 401, the MELT test output indicates: a no fault result returned by the MELT test output, in which the MELT test output returns a known reliable loop length estimate for the DSL line with the no fault result.

For instance, in the event of no fault detection, MELT testing will nevertheless provide a reliable loop length estimate, despite the absence of any detectable fault. Lack of fault detection by MELT does not, however, necessarily correlate to there being no fault on the DSL line as the SELT and/or DELT testing may provide detection despite MELT's inability to do so.

According to another embodiment of method 400 and 401, the MELT test output indicates: a series capacitive fault located on the tip or ring wire of the DSL line ("bad splice fault"); in which the MELT test output detects the series capacitive fault when the fault is beyond a threshold distance from the end of the DSL line; and in which the MELT test output returns an erroneous no fault result only when the series capacitive fault or bad splice fault is within the threshold distance from the end of the DSL line indicating a localization at or within a customer premises location.

The MELT type testing is only capable of detecting this fault when it is not close to the end of the loop and therefore, the MELT testing may return a false negative in the event that a bad splice fault exists at the customer premises. Therefore, the MELT test output may be appropriately interpreted as indicating that either no fault exists, or if such fault exists, then the fault will be at the end of the loop. In this case, for bad splice detection, complementary information from DELT and SELT tests is therefore relied upon to arrive upon the most probable and therefore accurate result.

According to another embodiment of method 400 and 401, the MELT test output indicates: a parallel fault between tip and ring wire of the DSL line ("isolation faults" between tip and ring); and in which the MELT test output indicates the parallel fault upon detection without fault localization information or a loop length estimate.

According to another embodiment of method 400 and 401, the MELT test output indicates an isolation fault to the ground or short-to-ground fault. Even in the case of a tip to ring isolation fault type, it is possible to return an accurate estimated localization result for the fault whereas previously available solutions cannot return any localization information whatsoever when encountering of this kind of fault type.

In certain specialized cases, the MELT testing may indicate via the test output that an isolation fault to the ground or short-to-ground fault is detected without providing fault localization information or a loop length estimate. This may occur where a parallel fault between tip and ring (isolation faults between tip and ring) are present, causing the MELT testing to return a detected fault without any localization information. In such specialized cases, the fault would simply be reported as the results output indicating the specialized fault condition in conjunction with a non-localized result; however, this would be the exception case rather than the preferred and more common usage.

According to another embodiment of method 400 and 401, the MELT test output indicates: presence of a signature at the end of the DSL loop; in which the MELT test output returns the loop length estimate for the DSL line when the presence of the signature is detected; in which reporting detection of the determined fault with the corresponding localization includes reporting that the determined fault is before a Network Interface Device (NID) and outside of a customer premises or alternatively reporting that the fault is after the NID and inside of the customer premises; and in which the presence of the signature when indicated by the MELT test output concurrent with the DELT and/or SELT test output indicating the potential fault on the DSL line corresponds to the potential fault being one of a bad splice type fault, a series and an insulation type fault, or a parallel type fault.

If MELT detects a signature, and DELT and/or SELT detect a fault (e.g., be it a bad splice type fault, a series type fault, an insulation type fault, or a parallel type fault), then the detected fault will be localized to having occurred after the NID and thus, inside the customer premises.

According to another embodiment of method 400 and 401, a bad splice type fault is indicated by each of the DELT and SELT test outputs; in which the MELT test output does not indicate the bad splice type fault on the DSL line in contradiction to the bad splice type fault being indicated by each of the DELT and SELT test outputs; and in which reporting detection of the determined fault with the corresponding localization includes reporting that the bad splice type fault is present on the DSL line and that localization of the bad splice type fault is within a customer premises location at the end of the DSL line based on capacitance to ground measurements being within a threshold distance of one another.

According to another embodiment of method 400 and 401, a DSL service provider that does not own the DSL line and instead leases the DSL line from a DSL line owner ("copper owner") to provide DSL services to the customer premises location via the DSL line is not responsible for faults on the DSL line that are located within a DSL network carrying the DSL line between a Central Office (CO) and a Network Interface Device (NID); in which localizing the determined fault by comparing the MELT test output, the DELT test output, and the SELT test output includes localizing the determined fault to the customer premises location; and in which the method further includes determining remedy of the determined fault is the responsibility of the copper owner due to the determined fault residing within the DSL network between a DSLAM and the NID and based on the absence of a presence of a signature at the NID.

Where a signature is detected, localization accuracy may be improved and the fault may thus be localized to being before or after the NID. For instance, where MELT indicates a bad splice detection the fault will be within the copper plant and not close to the end of the loop, so detection of the bad splice fault via MELT is indicative of the fault being at a location other than the end of the DSL loop, which again, provides improved localization by ruling out an area for the fault. Conversely, if MELT does not detect the bad splice fault then either there simply is no bad splice on the DSL line, or if there is, for instance, as detected and indicated by another test, then the fault may correctly be presumed to exist at the end of the DSL loop because MELT cannot detect the bad splice otherwise known to exist or detected by another test. Thus, when MELT is utilized in conjunction with SELT/DELT and appropriate assessment methodologies and corresponding functionality to perform the tests and analyze the test outputs, then it is possible to either wholly rule out the presence of a bad splice fault or localize the bad splice fault with improved accuracy versus what prior solutions were able to achieve. It should be noted that a bad splice fault is used here merely to illustrate a particular example, and by no means represents the only kind of fault localization and assessment possible.

Further still, given the presence of a signature and the end of the loop a loop length estimation is possible which is useful when the MELT testing does not detect a bad splice, but DELT/SELT indicate the existence of such fault. Because capacitance to ground measurements indicate that the bad splice should be near the end of the loop (e.g., the SELT distance and MELT/DELT or loop records of loop length may be used as confirmation), it may be the case that service providers who do not own the copper and merely lease access to the copper (e.g., the DSL loops) from another entity are not responsible for faults that are located in the network and between the CO and the NID. Consequently, if MELT test output indicates that the NID is detected, the detected bad splice should be after the NID, and as such repair of the fault will be the operator's (e.g., service provider's) responsibility. Conversely, it will be the responsibility of the copper owner, and not the operator/service provider when the bad splice type fault is localized to being within the DSL network between the DSLAM and the NID, thus preventing detection of the signature at the NID.

According to another embodiment of method 400 and 401, the DELT test output indicates non-availability of DELT testing on the DSL line and correlating the non-availability of DELT testing to: the DSL line being Out Of Service (OOS) according to the DELT test output due to any of (i) a DSL modem for the DSL line having been intentionally turned off or disconnected by a DSL customer, (ii) the DSL modem being defective, or (iii) a fault on the DSL line preventing the DSL modem from syncing up.

To be clear, the determination of a DSL line being Out Of Service (OOS) according to the DELT test output is not seeking an assessment of the modem's functionality or seeking to determine any kind of a fault with the modem itself, but rather, the methodology seeks to localize a fault which may be inside the customer premises, such as close to Customer Premises Equipment (e.g., "CPE" or a customer modem, or DSL equipment co-located with or near the CPE), or which may alternatively be within the cable plant. The different locations then correlating to differing entities having liability or responsibility to correct the fault on the DSL line.

According to another embodiment, method 400 and 401 further includes: ruling out the DSL line being OOS due to non-DSL line faults corresponding to (i) and (ii) and confirming the determined fault is present on the DSL line by verifying via customer input that the DSL modem is powered on and properly connected to the DSL line and that the DSL modem does not show any sign of obvious malfunction when the DELT testing indicates the DSL line is OOS. For instance, if items (i) and (ii) are ruled out as possibilities, then it may be correctly presumed that the fault is within the DSL line rather than the Customer Premises Equipment to which it is connected. Localization may then be determined based upon the loop length and the distance to the fault.

According to another embodiment of method 400 and 401, localizing the potential fault further includes returning one of: an estimated distance to the fault from a Digital Subscriber Line Access Multiplexer (DSLAM) coupled with the DSL line; geographic coordinates corresponding to the localization of the potential fault; and a correlation of the estimated distance to the fault with previously known loop topology inventory localizing the potential fault to particular DSL line distribution component for a DSL system within which the DSL line operates.

According to certain embodiments, a geographical location of the fault is returned while in other embodiments functionality correlates the distance to the fault with loop topology from a known inventory of loop lengths and topologies to localize the fault as potentially being at a particular distribution box, such as the DSLAM's cabinet.

According to a particular embodiment, there is non-transitory computer readable storage media having instructions stored thereupon that, when executed by a processor of a fault detection server, the instructions cause the fault detection server to perform operations including: receiving Metallic Loop/Line Testing (MELT) test output from applying a MELT test to a DSL line, the MELT test output indicating whether a potential fault is detected on the DSL line via the MELT testing, an estimated distance to the fault, and a corresponding fault type based on the MELT test output; receiving Dual-End Line Testing (DELT) test output from applying a DELT test to the DSL line, the DELT test output indicating whether the potential fault is detected on the DSL line via the DELT testing and a corresponding fault type based on the DELT test output; receiving Single-Ended Loop Testing (SELT) test output from applying a SELT test to the DSL line, the SELT test output indicating whether the potential fault is detected on the DSL line via the SELT testing, an estimated distance to the fault, and a corresponding fault type based on the SELT test output; determining a fault is present on the DSL line by evaluating detection reliability of any potential fault indicated via the MELT, DELT, and SELT testing by comparing the MELT test output, the DELT test output, and the SELT test output; localizing the determined fault by comparing the MELT test output, the DELT test output, and the SELT test output; and reporting detection of the determined fault with a corresponding localization and fault type as determined from the comparison of the MELT, DELT, and SELT test outputs.

According to another embodiment, the fault detection server described is implemented by a third party service provider different than a DSL operator that owns and is responsible for networking equipment to operate the DSL lines and different than a DSL services provider responsible for providing DSL communication services to DSL service customers; and in which the fault detection server communicably interfaces to the DSL line over a public Internet through DSL networking elements of the DSL system operator or the DSL services provider.

According to another embodiment, the third party service provider provides fault detection services at the DSL line level for a plurality of DSL lines within a DSL network as a subscription based cloud service.

Figure 5:
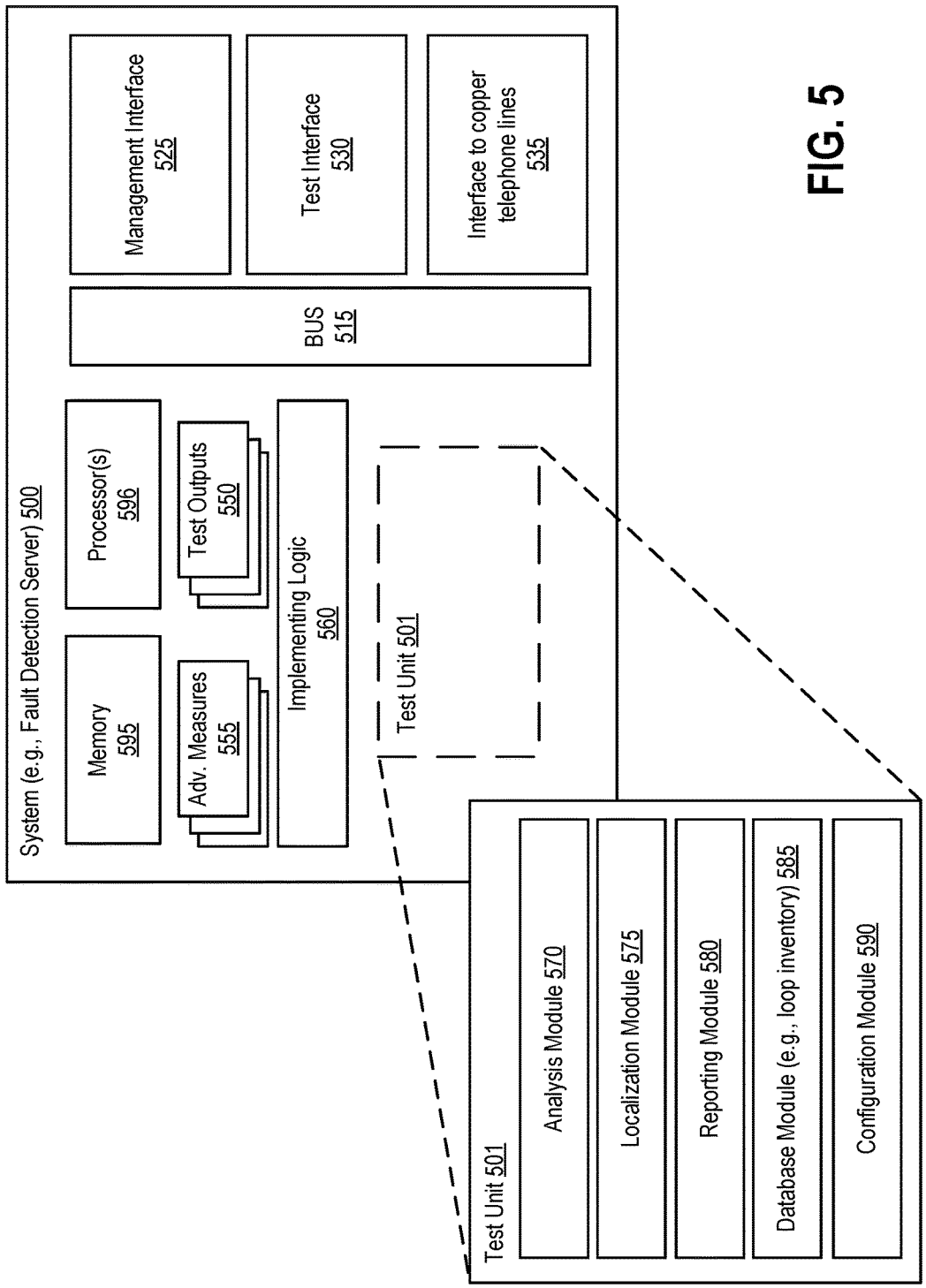
FIG. 5 illustrates a diagrammatic representation of a system in accordance with which embodiments may operate, be installed, integrated, or configured.

FIG. 5 illustrates a diagrammatic representation of a system 500 in accordance with which embodiments may operate, be installed, integrated, or configured.

In accordance with one embodiment, there is a system 500 (e.g., a fault detection server) having at least a processor 596 and a memory 595 therein to execute implementing logic and/or instructions 560. Such a system 500 may communicatively interface with and cooperatively execute with the benefit of a hosted computing environment, such as an on-demand service provider, a cloud based service provider, or any entity which operates remotely from the systems being evaluated in which the remote system and the systems being evaluated are communicably interfaced over a network, such as a public Internet. Alternatively, system 500 may be co-located with, or even embodied within DSL communications equipment deployed into the field. Thus, system 500 may reside at a hosted computing environment and provide, as a service, DSL line testing and analysis to identify and localize faults or may reside within DSL communications equipment and again provide functionality by which to identify and localize faults.

In one embodiment, system 500 includes communication bus(es) 515 to transfer transactions, instructions, requests, test results, analysis, configuration parameters, advanced measures of reliability and decision parameters to rule in or rule out conflicting results, exchange configurable weights and probability factors, and other data within system 500 among a plurality of peripheral devices communicably interfaced with one or more communication buses 515. System 500 further includes management interface 525, for example, to receive requests, return responses, and otherwise interface with network elements located separately from system 500.

In some embodiments, management interface 525 communicates information via an out-of-band connection separate from DSL line based communications, where "in-band" communications are communications that traverse the same communication means as payload data (e.g., content) being exchanged between networked devices and where "out-of-band" communications are communications that traverse an isolated communication means, separate from the mechanism for communicating the payload data. An out-of-band connection may serve as a redundant or backup interface over which to communicate control data between the system 500 and other networked devices or between the system 500 and a third party service provider. For example, management interface may provide a means by which to communicate with system 500 to provide or receive management related functions and information, test interface 530 may provide means by which to communicate and receive testing parameters, instructions, output, etc. And the interface(s) to the copper telephone lines 535 may provide means by which to issue tests against DSL lines or communicate test information and receive testing results from such copper telephone lines or DSL lines.

Distinct within system 500 is test unit 501 which includes analysis module 570, localization module 575, reporting module 580, database module 585 (e.g., having therein or providing access to, for example, DSL loop inventory including known topologies and line lengths as well as other characteristics of such DSL lines within a DSL network), and a configuration module 590. Test unit 501 may be installed and configured in a compatible system 500 as is depicted by FIG. 5, or provided separately so as to operate in conjunction with appropriate implementing logic 560 or other software.

According to a particular embodiment, the system 500 includes the processor 596 and the memory 595 to execute instructions and functionality at the system 500 to carry out the described methodologies and more specifically, the system 500 includes a test interface 530 to apply a Metallic Loop/Line Testing (MELT) test to a DSL line and to receive MELT test output (e.g., test outputs 550) pursuant to the application of the MELT test to the DSL line, in which the MELT test output indicates whether a potential fault is detected on the DSL line via the MELT test, an estimated distance to the fault, and a corresponding fault type based on the MELT test output. According to such an embodiment, the test interface 530 is to further apply a Dual-End Line Testing (DELT) test to the DSL line and is to receive DELT test output (e.g., test outputs 550) pursuant to the application of the DELT test to the DSL line, the DELT test output to indicate whether the potential fault is detected on the DSL line via the DELT test and a corresponding fault type based on the DELT test output (e.g., test outputs 550). Still further, the test interface 530 is to apply a Single-Ended Loop Testing (SELT) test to the DSL line and to receive SELT test output (e.g., test outputs 550) pursuant to the application of the SELT test to the DSL line, the SELT test output to indicate whether the potential fault is detected on the DSL line via the SELT test, an estimated distance to the fault, and a corresponding fault type based on the SELT test output (e.g., test outputs 550). According to the depicted embodiment, an analysis module 570 (e.g., which may optionally be embodied within a test unit 501) is to determine a fault is present on the DSL line by evaluating detection reliability (potentially utilizing advanced measures 555 of detection reliability established previously) of any potential fault indicated via the MELT, DELT, and SELT tests by comparing the MELT test output, the DELT test output, and the SELT test output. The depicted embodiment further includes a localization module 575 to localize the determined fault by comparing the MELT test output, the DELT test output, and the SELT test output (the localization may also utilize advanced measures 555 of localization reliability as determined previously); and a reporting module 580 of the system 500 is to report detection of the determined fault with a corresponding localization and fault type as determined by the localization module comparing the MELT, DELT, and SELT test outputs.

According to the described embodiments, the system may be configurable, for instance, via the management interface 525 to manipulate, program, or alter configurations as stored and carried out by the configuration module 590. Moreover, the system 500 may reference or otherwise utilize the database module 585 to access loop inventories and other information about the DSL lines to which testing is being applied.

In accordance with another embodiment of system 500, a third party service provider implements and operates the fault detection server at a location different than a DSL operator that owns and is responsible for networking equipment to operate the DSL lines and different than a DSL services provider responsible for providing DSL communication services to DSL service customers; and in which the test interface 530 of the fault detection server (e.g., system 500) communicatively links with the DSL lines over a public Internet through DSL networking elements of the DSL system operator or the DSL services provider.

According to another embodiment, the system 500 operates as a server of a cloud service provider physically remote from a Customer Premises Equipment (CPE) modem at a business or residence of a DSL subscriber associated with one of the plurality of DSL lines and physically remote from a Central Office (CO) which provides communication services to the CPE modem.

Figure 6:
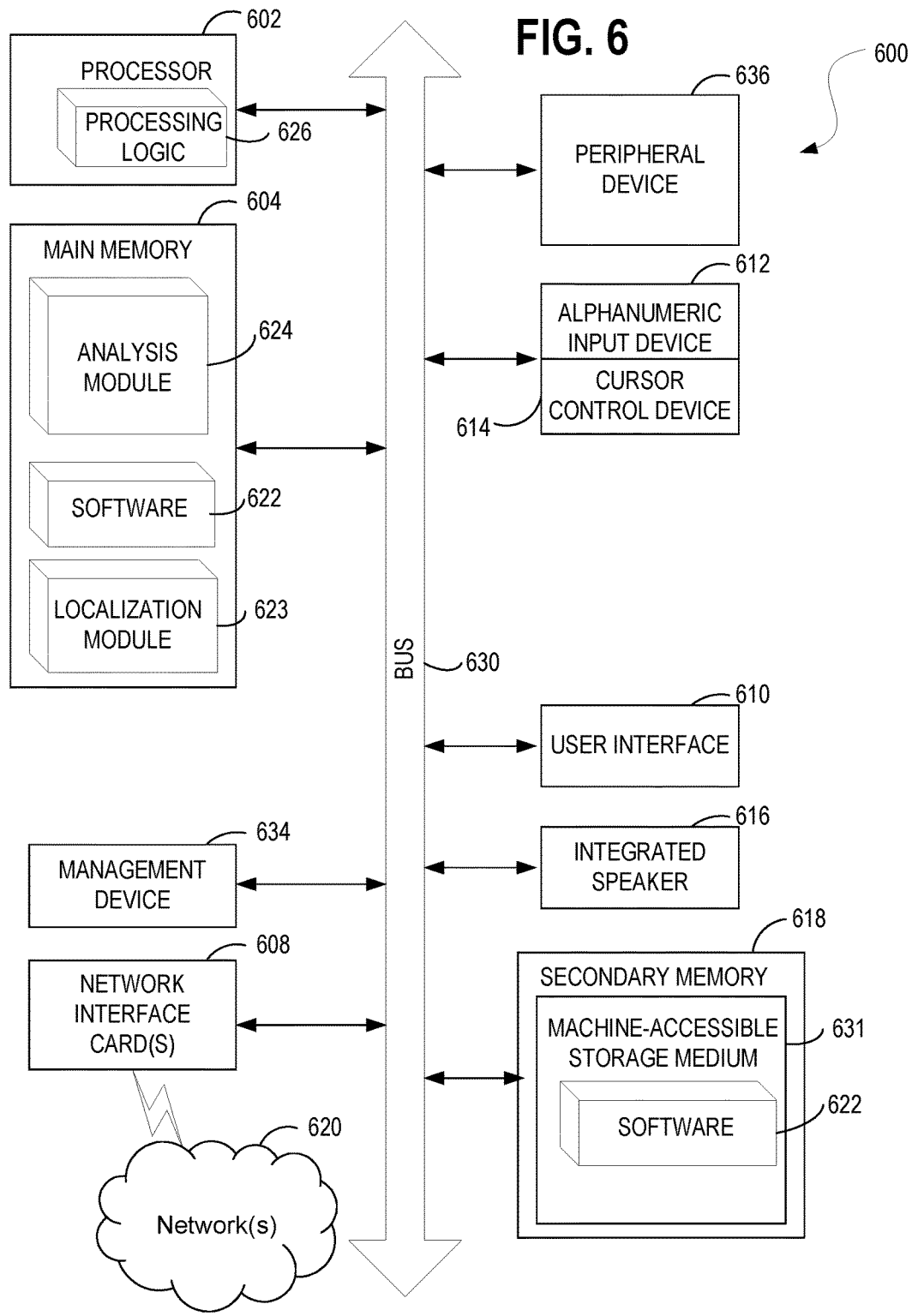
FIG. 6 illustrates a diagrammatic representation of a machine in the exemplary form of a computer system.

FIG. 6 illustrates a diagrammatic representation of a machine 600 in the exemplary form of a computer system, in accordance with one embodiment, within which a set of instructions, for causing the machine 600 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and persistent data base implementations), which communicate with each other via a bus 630. Main memory 604 includes information and instructions and software program components necessary for performing and executing the functions with respect to the various embodiments of the systems, methods, and management device as described herein. Localization module 623 and analysis module 624 may be stored within main memory 604 and execute from main memory 604 to carry out the methodologies as described herein. Main memory 604 and its sub-elements (e.g., 623 and 624) are operable in conjunction with processing logic 626 and/or software 622 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include one or more network interface cards 608 to communicatively interface the computer system 600 with one or more networks 620 from which information may be collected for analysis. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.). The computer system 600 may perform the functions of a management device 634 capable of interfacing with digital communication lines such as copper telephone lines within a vectored and non-vectored groups, monitoring, collecting, analyzing, and reporting information, and initiating, triggering, and executing various fault detection and localization instructions.

The secondary memory 618 may include a non-transitory machine-readable storage medium (or more specifically a non-transitory machine-accessible storage medium) 631 on which is stored one or more sets of instructions (e.g., software 622) embodying any one or more of the methodologies or functions described herein. Software 622 may also reside, or alternatively reside within main memory 604, and may further reside completely or at least partially within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
   receiving Metallic Loop/Line Testing (MELT) test output from applying a MELT test to a DSL line;
   receiving Dual-End Line Testing (DELT) test output from applying a DELT test to the DSL line;
   receiving Single-Ended Loop Testing (SELT) test output from applying a SELT test to the DSL line;
   determining one or more faults are present on the DSL line by comparing the MELT test output, the DELT test output, and the SELT test output; and
   localizing the one or more determined faults by comparing the MELT test output, the DELT test output, and the SELT test output to localize a potential fault with reference to a geographic distance from an end of a DSL loop or with reference to a geographic location relative to the end of the DSL loop.

2. The method of claim 1:
   wherein the MELT test output indicates the potential fault is detected on the DSL line via the MELT testing, an estimated distance to the fault, and a corresponding fault type based on the MELT test output;
   wherein the DELT test output indicates the potential fault is detected on the DSL line via the DELT testing and a corresponding fault type based on the DELT test output; and
   wherein the SELT test output indicates the potential fault is detected on the DSL line via the SELT testing, an estimated distance to the fault, and a corresponding fault type based on the SELT test output.

3. The method of claim 1, wherein determining the one or more faults comprises: evaluating detection reliability of any potential fault indicated via the MELT, DELT, and SELT testing by comparing the MELT test output, the DELT test output, and the SELT test output.

4. The method of claim 1, further comprising:
   reporting detection of the one or more determined faults with corresponding localizations and fault types as determined from the comparison of the MELT, DELT, and SELT test outputs.

5. The method of claim 1, further comprising:
   providing a list of physical layer fault types for the DSL line; and
   providing a correlation between observable measurements on the DSL line via the MELT, DELT, and SELT testing and the list of physical layer fault types for the DSL line.

6. The method of claim 5, wherein the correlation between observable measurements on the DSL line correlates measurements recorded in any of the MELT test output, the DELT test output, and the SELT test output with any of the physical layer fault types for the DSL line including: (i) a no fault result, (ii) a single fault result, or (iii) a multiple fault result for the DSL line.

7. The method of claim 5:
   wherein the MELT, DELT, and/or SELT test outputs received exhibit a complementary fault result in which two or more of the MELT, DELT, or SELT test outputs indicate potential faults and corresponding fault types that are logically and permissibly present on the DSL line at the same time according to the provided correlation between observable measurements on the DSL line and the list of physical layer fault types for the DSL line; and
   wherein determining the fault is present on the DSL line comprises accepting the complementary fault result based on the provided correlation between observable measurements on the DSL line the list of physical layer fault types for the DSL line.

8. The method of claim 5:
wherein the MELT, DELT, and/or SELT test outputs received exhibit complementary fault results in which (i) the DELT test output indicates a bridge tap, further in which (ii) the MELT test output and the SELT test output both indicate a bad splice; and
wherein MELT, DELT, or SELT test outputs are determined to exhibit the complementary fault results based on each of the bridge tap indicated via the DELT test output and the bad splice indicated by each of the MELT and SELT test outputs being logically compatible simultaneously on the DSL line based on the according to the provided correlation between observable measurements on the DSL line and the list of physical layer fault types for the DSL line.

9. The method of claim 1, further comprising:
providing an advanced measure of detection reliability for each of a plurality of physical layer fault types returnable by any one or more of the MELT, DELT, and SELT tests.

10. The method of claim 9:
wherein the MELT, DELT, and/or SELT test outputs received exhibit a redundant fault result in which two or more of the MELT, DELT, or SELT test outputs indicate the same potential fault detected on the DSL line and the same corresponding fault type;
wherein determining the fault is present on the DSL line comprises accepting the redundant fault result based on the advanced measure of the detection reliability and the provided correlation between observable measurements on the DSL line and the list of physical layer fault types for the DSL line.

11. The method of claim 9:
wherein the MELT, DELT, and/or SELT test outputs received exhibit a contradictory fault result in which two or more of the MELT, DELT, or SELT test outputs indicate potential faults and corresponding fault types that cannot logically be present on the DSL line at the same time according to the provided correlation between observable measurements on the DSL line and the list of physical layer fault types for the DSL line; and
wherein determining the fault is present on the DSL line comprises resolving the contradictory fault result by ruling in or ruling out one of the potential faults and corresponding fault types indicated by the MELT, DELT, or SELT test outputs based on the advanced measure of the detection reliability for each the physical layer fault types returnable by any one or more of the MELT, DELT, and SELT testing.

12. The method of claim 11:
wherein ruling in or ruling out one of the potential faults and corresponding fault types indicated by the MELT, DELT, or SELT test outputs based on the advanced measure of the detection reliability for each the physical layer fault types returnable by any one or more of the MELT, DELT, and SELT testing comprises one or both of:
accepting one of the potential faults and corresponding fault types indicated by the MELT, DELT, or SELT test outputs according to which has the greatest advanced measure of the detection reliability;
negating one of the potential faults and corresponding fault types indicated by the MELT, DELT, or SELT test outputs according to which has the lesser advanced measure of the detection reliability; and
wherein negating one of the potential faults comprises eliminating the one potential fault as logically impermissible in the presence of any other detected fault having a higher advanced measure of detection reliability.

13. The method of claim 5, wherein localizing the determined fault by comparing the MELT test output, the DELT test output, and the SELT test output comprises one of:
(i) accepting the estimated distance to the fault as indicated by the MELT test output and the estimated distance to the fault as indicated by the SELT test output when the MELT and SELT test outputs are redundant or within a threshold range of one another;
(ii) resolving a contradictory fault result in the estimated distance to the fault as indicated by the MELT and SELT test outputs by ruling in or ruling out one of the MELT or SELT test outputs based on an advanced measure of the localization reliability for each the estimated distances to the fault returnable by the MELT or SELT testing; and
(iii) identifying at least two potential faults and localizations to the at least two potential faults, wherein the MELT, DELT, and/or SELT test outputs received indicate the at least two potential faults as complementary fault results within the MELT, DELT, and/or SELT test outputs that are logically and permissibly present on the DSL line at the same time according to the provided correlation between observable measurements on the DSL line and the list of physical layer fault types for the DSL line, and accepting an estimated distance to each of the at least two potential faults as indicated by the MELT, DELT, and/or SELT test outputs.

14. The method of claim 1, further comprising:
retrieving a recorded line length for the DSL line from database; and
localizing the potential fault comprises comparing MELT and SELT loop lengths or distances to the potential fault and DELT loop lengths returned with the MELT, SELT, and DELT test outputs respectively and further updating the localization based on the recorded line length for the DSL line.

15. The method of claim 1, wherein the MELT test output indicating the potential fault and the corresponding fault type is based on a measurement of one or more of:
tip-to-ring resistance;
ring-to-tip resistance;
tip-to-ground resistance;
ring-to-ground resistance;
tip-to-ring capacitance;
tip-to-ground capacitance;
ring-to-ground capacitance;
tip-to-ring conductance and susceptance;
tip-to-ground conductance and susceptance;
ring-to-ground conductance and susceptance;
AC foreign current on tip;
AC foreign current on ring;
DC foreign current on tip;
DC foreign current on ring;
tip-to-ring AC voltage;
tip-to-ground AC voltage;
ring-to-ground AC voltage;
tip-to-ring DC voltage;
tip-to-ground DC voltage; and
ring-to-ground DC voltage.

16. The method of claim 1:
wherein the SELT test output indicating the potential fault and the corresponding fault type is based on a measurement of one or more of: an Uncalibrated Echo Response (UER) per sub-carrier, an Uncalibrated Echo Response (UER) measurement variance per sub-carrier, calibration data for obtaining a Calibrated Echo Response per sub-carrier, and a Quiet Line Noise (QLN) measurement per sub-carrier; and wherein the DELT test output indicating the potential fault and the corresponding fault type is based on a measurement of one or more of: a Signal to Noise Ratio (SNR) per sub-carrier, insertion loss in logarithmic scale (HLOG) per sub-carrier, actual transmit Power Spectral Density (PSD) per sub-carrier, fine gains per sub-carrier, and a Quiet Line Noise (QLN) measurement per sub-carrier.

17. The method of claim 1, wherein the MELT test output further indicates a MELT test signature at an end of the DSL loop communicably interfaced to a Network Interface Device (NID) by:
  (i) comparing tip-to-ring and ring-to-tip resistance measurements returned by the MELT test output;
  (ii) analyzing AC conductance and susceptance measurements returned by the MELT test output;
  (iii) analyzing measurements with different test voltage amplitudes returned by the MELT test output; or
  (iv) any combination of (i), (ii), and (iii).

18. The method of claim 1, wherein the MELT test output indicates:
  a no fault result returned by the MELT test output, wherein the MELT test output returns a known reliable loop length estimate for the DSL line with the no fault result.

19. The method of claim 1, wherein the MELT test output indicates:
  a series capacitive fault located on the tip or ring wire of the DSL line ("bad splice fault");
  wherein the MELT test output detects the series capacitive fault when the fault is beyond a threshold distance from the end of the DSL line; and
  wherein the MELT test output returns an erroneous no fault result only when the series capacitive fault or bad splice fault is within the threshold distance from the end of the DSL line indicating a localization at or within a customer premises location.

20. The method of claim 1, wherein the MELT test output indicates:
  a parallel fault between tip and ring wire of the DSL line ("isolation faults" between tip and ring); and
  wherein the MELT test output indicates the parallel fault upon detection without fault localization information or a loop length estimate.

21. The method of claim 1, wherein the MELT test output indicates an isolation fault to the ground or short-to-ground fault.

22. The method of claim 1, wherein the MELT test output indicates:
  presence of a signature at the end of the DSL loop;
  wherein the MELT test output returns the loop length estimate for the DSL line when the presence of the signature is detected;
  wherein reporting detection of the determined fault with the corresponding localization comprises reporting that the determined fault is before a Network Interface Device (NID) and outside of a customer premises or alternatively reporting that the fault is after the NID and inside of the customer premises; and
  wherein the presence of the signature when indicated by the MELT test output concurrent with the DELT and/or SELT test output indicating the potential fault on the DSL line is located after the NID and inside of the customer premises.

23. The method of claim 1:
wherein a bad splice type fault is indicated by each of the DELT and SELT test outputs;
wherein the MELT test output does not indicate the bad splice type fault on the DSL line in contradiction to the bad splice type fault being indicated by each of the DELT and SELT test outputs; and
wherein reporting detection of the determined fault with the corresponding localization comprises reporting that the bad splice type fault is present on the DSL line and that localization of the bad splice type fault is within a customer premises location at the end of the DSL line based on capacitance to ground measurements being within a threshold distance of one another.

24. The method of claim 23:
wherein a DSL service provider that does not own the DSL line and instead leases the DSL line from a DSL line owner ("copper owner") to provide DSL services to the customer premises location via the DSL line is not responsible for faults on the DSL line that are located within a DSL network carrying the DSL line between a Central Office (CO) and a Network Interface Device (NID);
wherein localizing the determined fault by comparing the MELT test output, the DELT test output, and the SELT test output comprises localizing the determined fault to the customer premises location; and
wherein the method further comprises determining remedy of the determined fault is the responsibility of the copper owner due to the determined fault residing within the DSL network between a DSLAM and the NID.

25. The method of claim 1, wherein the DELT test output indicates non-availability of DELT testing on the DSL line and correlating the non-availability of DELT testing to:
  the DSL line being Out Of Service (OOS) according to the DELT test output due to any of (i) a DSL modem for the DSL line having been intentionally turned off or disconnected by a DSL customer, (ii) the DSL modem being defective, or (iii) a fault on the DSL line preventing the DSL modem from syncing up.

26. The method of claim 25, further comprising:
  ruling out the DSL line being OOS due to non-DSL line faults corresponding to (i) and (ii) and confirming the determined fault is present on the DSL line by verifying via customer input that the DSL modem is powered on and properly connected to the DSL line and that the DSL modem does not show any sign of obvious malfunction when the DELT testing indicates the DSL line is OOS.

27. The method of claim 1, wherein localizing the potential fault further comprises returning one of:
  an estimated distance to the fault from a Digital Subscriber Line Access Multiplexer (DSLAM) coupled with the DSL line;
  geographic coordinates corresponding to the localization of the potential fault; and
  a correlation of the estimated distance to the fault with previously known loop topology inventory localizing the potential fault to particular DSL line distribution component for a DSL system within which the DSL line operates.

28. Non-transitory computer readable storage media having instructions stored thereupon that, when executed by a processor of a fault detection server, the instructions cause the fault detection server to perform operations including:
   receiving Metallic Loop/Line Testing (MELT) test output from applying a MELT test to a DSL line;
   receiving Dual-End Line Testing (DELT) test output from applying a DELT test to the DSL line;
   receiving Single-Ended Loop Testing (SELT) test output from applying a SELT test to the DSL line;
   determining one or more faults are present on the DSL line by comparing the MELT test output, the DELT test output, and the SELT test output;
   localizing the one or more determined faults by comparing the MELT test output, the DELT test output, and the SELT test output to localize a potential fault with reference to a geographic distance from an end of a DSL loop or with reference to a geographic location relative to the end of the DSL loop.

29. The non-transitory computer readable storage media of claim 28:
   wherein the fault detection server is implemented by a third party service provider different than a DSL operator that owns and is responsible for networking equipment to operate the DSL lines and different than a DSL services provider responsible for providing DSL communication services to DSL service customers; and
   wherein the fault detection server communicably interfaces to the DSL line over a public Internet through DSL networking elements of the DSL system operator or the DSL services provider.

30. The non-transitory computer readable storage media of claim 28, wherein the third party service provider provides fault detection services at the DSL line level for a plurality of DSL lines within a DSL network as a subscription based cloud service.

31. A fault detection server, comprising:
   a memory to store instructions for execution;
   a processor to execute the instructions;
   a test interface apply a Metallic Loop/Line Testing (MELT) test to a DSL line and to receive MELT test output pursuant to the application of the MELT test to the DSL line; the test interface apply a Dual-End Line Testing (DELT) test to the DSL line and to receive DELT test output pursuant to the application of the DELT test to the DSL line; the test interface apply a Single-Ended Loop Testing (SELT) test to the DSL line and to receive SELT test output pursuant to the application of the SELT test to the DSL line; an analysis module to determine one or more faults are present on the DSL line by comparing the MELT test output, the DELT test output, and the SELT test output; a localization module to localize the one or more determined faults with reference to a geographic distance from an end of a DSL loop or with reference to a geographic location relative to the end of the DSL loop by comparing the MELT test output, the DELT test output, and the SELT test output.

32. The fault detection server of claim 31:
   wherein a third party service provider implements and operates the fault detection server at a location different than a DSL operator that owns and is responsible for networking equipment to operate the DSL lines and different than a DSL services provider responsible for providing DSL communication services to DSL service customers; and
   wherein the test interface of the fault detection server communicatively links with the DSL lines over a public Internet through DSL networking elements of the DSL system operator or the DSL services provider.

* * * * *